(12) United States Patent
Kosik et al.

(10) Patent No.: US 6,171,213 B1
(45) Date of Patent: Jan. 9, 2001

(54) AUTOMATIC CLUTCH

(75) Inventors: Franz Kosik, Ostfildern; Thomas Grass, Urbach, both of (DE)

(73) Assignee: DaimlerChrysler AG, Stuttgart (DE)

(*) Notice: Under 35 U.S.C. 154(b), the term of this patent shall be extended for 0 days.

(21) Appl. No.: 09/230,063

(22) PCT Filed: Jul. 2, 1997

(86) PCT No.: PCT/EP97/03484

§ 371 Date: Jan. 19, 1999

§ 102(e) Date: Jan. 19, 1999

(87) PCT Pub. No.: WO98/03367

PCT Pub. Date: Jan. 29, 1998

(30) Foreign Application Priority Data

Jul. 17, 1996 (DE) .............................................. 196 28 787

(51) Int. Cl.⁷ .................................................. B60K 41/02
(52) U.S. Cl. .................................................. 477/86; 477/84
(58) Field of Search ................................. 477/79, 83, 84, 477/86

(56) References Cited

U.S. PATENT DOCUMENTS

| | | | | |
|---|---|---|---|---|
| 3,904,007 | * | 9/1975 | Braun et al. | 477/86 X |
| 4,662,494 | * | 5/1987 | Wakiya et al. | 477/83 |
| 5,099,969 | * | 3/1992 | Ohtake | 477/86 |
| 5,293,316 | * | 3/1994 | Slicker | 477/86 X |
| 5,782,710 | * | 7/1998 | Kosik et al. | 477/86 |
| 5,839,989 | * | 11/1998 | Saito et al. | 477/83 X |
| 5,941,792 | * | 8/1999 | Amendt et al. | 477/84 X |
| 5,989,153 | * | 11/1999 | Fischer et al. | 477/84 X |
| 6,033,340 | * | 3/2000 | Amendt et al. | 477/83 X |

FOREIGN PATENT DOCUMENTS

| | | |
|---|---|---|
| 0 108 315 A2 | 5/1984 | (EP) . |
| 2 158 912 | 11/1985 | (GB) . |
| 2 280 721 | 2/1995 | (GB) . |

\* cited by examiner

Primary Examiner—Charles A Marmor
Assistant Examiner—Roger Pang
(74) Attorney, Agent, or Firm—Evenson, McKeown, Edwards, Lenahan, P.L.L.C.

(57) ABSTRACT

An automatically controllable clutch is arranged between the engine and the driving wheels in the transmission line of a motor vehicle. A transmission can be shifted arbitrarily or manually between idling and at least one driving position. An accelerator pedal or the like control the power of the engine, and a control device controls the clutch as a function of defined parameters detected by assigned sensors. When the driving position is engaged and the accelerator pedal is not operated, the clutch operates at its gripping point and transmits a low torque which is sufficient for a creeping of the vehicle on a level road or at a very low tractive resistance. When an approximated synchronism of the clutch input and the clutch output has been reached during the phase with an engaged driving position and while the accelerator pedal is not operated, the clutch is closed when the accelerator pedal is operated while maintaining the synchronism.

13 Claims, 1 Drawing Sheet

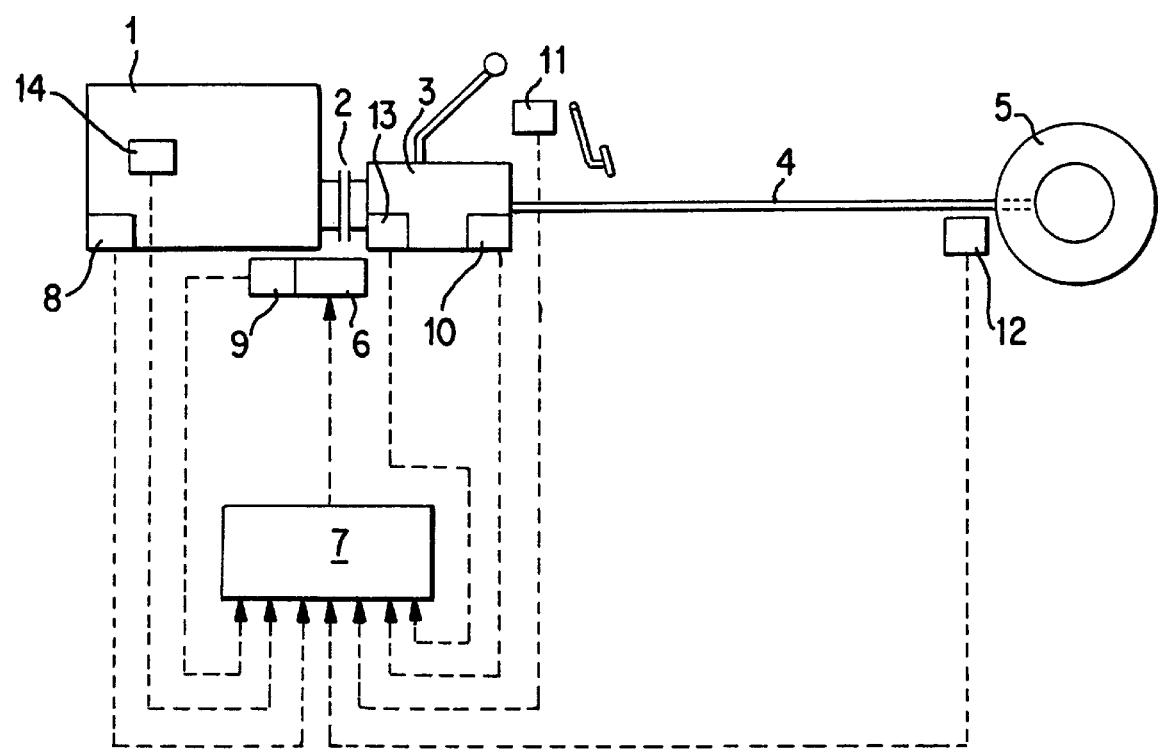

AUTOMATIC CLUTCH

BACKGROUND OF THE INVENTION

This application claims the priority of German application No. 196 28 787.1 and PCT/EP97/03484, filed Jul. 17, 1996 and Jul. 2, 1996, respectively, the disclosures of which are expressly incorporated by reference herein.

The present invention relates to an automatically controllable clutch between the engine and the driving wheels in the transmission line of a motor vehicle, having a transmission which can be shifted arbitrarily or manually between idling and at least one driving position, as well as having an accelerator pedal or the like for controlling the power of the engine, having a control device which controls the clutch as a function of defined parameters detected by assigned sensors. When the driving position is engaged and the accelerator pedal is not operated, the present invention has the effect that the clutch operates at its gripping point and transmits a low torque which is sufficient for a creeping of the vehicle on a level road or at a very low tractive resistance.

Motor vehicles with manually shifted gears and an automatically controlled clutch are known and are mass produced. Since, in the normal operation, the clutch as well as the transmission operate mechanically without slip, a high efficiency can be achieved; that is, corresponding systems are also suitable for comparatively low-power engines. Simultaneously, as the result of the automatic clutch, a clear increase in comfort is achieved, particularly in city stop-and-go traffic. Parking maneuvers are also facilitated in principle because, in contrast to a vehicle with a clutch which can be operated arbitrarily, for example by the pedal, the driver must not constantly "play" with the clutch.

In order to facilitate parking maneuvers and to provide the driver with a good feeling as to when and how the clutch starts to grip, British Patent No. 2 158 912 A as well as EP 0 108 315 A1 teach that, when the driving position is engaged and the accelerator pedal is not operated, the clutch already transmits a low torque which is sufficient for a creeping of the vehicle at a low tractive resistance. As soon as the driver then operates the accelerator pedal, the clutch can be controlled as a function of the torque of the vehicle engine and/or as a function of the torque which is transmitted by a shaft of the transmission line.

It is an object of the present invention to optimize, in vehicles with clutches of the initially mentioned type, the operating performance, particularly with respect to parking maneuvers.

According to the present invention, this object has been achieved by providing that, when an approximated synchronism of the clutch input and the clutch output has been reached during the phase with an engaged driving position and while the accelerator pedal is not operated, the clutch is closed when the accelerator pedal is operated while maintaining the synchronism.

The invention transmits a very slight torque to the driving wheels also when the accelerator pedal is not operated and the driving position is engaged so that the vehicle has a slight tendency to creep. This is easily possible because modern engines have a well stabilized rotational idling speed and the torque of the engine is automatically controlled for maintaining the rotational idling speed largely without delay. For the driver, the constant torque transmission to the driving wheels has the advantage that, as required, the tendency of the vehicle to creep can be slightly reduced by the service brake and can easily be increased by operating the accelerator pedal. Because the clutch constantly operates with a weak frictional connection, i.e., at its gripping point, the driver does not have to "feel out" this gripping point by operating the accelerator pedal. As a result, the vehicle acts similarly to a vehicle with a conventional automatic transmission.

By way of the characteristics according to the present invention, only a low wear of the clutch is to be advantageously expected. Consequently, even a reduction of wear may be expected because, in the case of many creeping maneuvers, a synchronism will occur within a short time between the clutch input and the clutch output and, when the accelerator pedal is now operated for accelerating the vehicle, the clutch can regularly be held in the closed condition and thus in a condition with a synchronism between the clutch input and the clutch output. When, however, the accelerator pedal is operated before the reaching of the synchronism of the clutch input and output, a particularly strong acceleration of the vehicle is achievable because the closing of the clutch takes place only at an increased rotational engine speed and an increased engine torque.

BRIEF DESCRIPTION OF THE DRAWING

These and further objects, features and advantages of the present invention will become more apparent from the following detailed description of a currently preferred embodiment when taken in conjunction with the accompanying sole FIGURE.

The single FIGURE is a schematic representation of the transmission line of a motor vehicle with a clutch according to the present invention.

DETAILED DESCRIPTION OF THE DRAWING

In a known motor vehicle, a combustion engine 1 is coupled with respect to the drive with driving wheels 5 of the vehicle by way of an automatically controlled clutch 2, a manually shifted transmission 3 and a drive shaft 4, such as a cardan shaft. The operation of the clutch takes place by way of a motor-driven adjusting unit 6 which is operated by a computer-assisted control device 7 as a function of parameters. For detecting the parameters, the control device 7 is connected on the input side with a corresponding sensor system. This sensor system comprises a sensor 8 for the rotational speed of the engine a sensor 9 for the adjusting path of the adjusting unit; a sensor 10 for detecting the respective engaged driving position of the transmission 3; a sensor 11 which reflects the operation of an accelerator pedal controlling the power of the engine 1; sensors 12 for the rotational speed of the driving wheels; and, optionally, a sensor 13 for the rotational speed of the output of the clutch 2. In addition, the control device 7 may also communicate or be combined with an engine control system 14.

A special characteristic of the present invention is the fact that the clutch 2 is adjusted to its gripping point; i.e., to a very low frictional connection, in the case of which only a very low torque can be transmitted, when the sensor 11 signals a not operated accelerator pedal and the sensor 10 reports that a driving position of the transmission 3 is engaged. During the adjustment of the gripping point, signals of the engine control system 14 can be utilized which, on one hand, when the accelerator pedal is not operated, stabilizes the rotational speed of the engine close to its rotational idling speed and, on the other hand, is capable of generating signals which reflect the torque of the engine. This is based on the fact that the control measures of the engine control system 14 required for stabilizing the rotational speed change the engine torque, and correspondingly the corresponding control commands also contain an information concerning the torque of the engine 1. At a constant rotational speed of the engine 1, the respective torque of the engine 1 corresponds to the torque transmitted by the clutch 2. As the result, the gripping point of the clutch 2 can therefore be determined in that the adjusting unit 6 and thus the clutch 2 are operated such that the torque of the engine 1 and therefore the torque transmitted by the clutch 2 have a defined low value.

On a level road or at a low tractive resistance, this low transmitted torque of the clutch 2 has the result that the vehicle attempts to creep, in which case the creeping speed may be reduced by operating the vehicle brake (not shown).

If, during the creeping movement on a level firm road, the vehicle covers a sufficient distance without the operation of the vehicle brake, the rotational speeds of the input and the output of the clutch 2 will approximate one another. This approximation can be determined by analyzing the signals of the sensors 8 and 13 which, on one hand, record the rotational engine speed and therefore also the rotational speed of the clutch input non-rotatably connected with the engine and, on the other hand, the rotational speed of the clutch output.

Optionally, the sensor 13 can be eliminated. For example, the rotational speed of the clutch output can also be determined from the rotational speed of the driving wheels 5 recorded by the sensors 12 and from the engaged transmission position reported by the sensor 10, that is, from the defined ratio of the transmission 3. As soon as now, in the case of a creeping movement of the vehicle, an at least approximated synchronism of the input and the output of the clutch 2 is determined, the clutch 2 is kept closed during an operation of the accelerator pedal which takes place now, in order to, on one hand, minimize the wear of the clutch and, on the other hand, the fuel consumption of the engine 1. In the case of modern internal-combustion engines, it is always possible to accelerate the engine 1 also from very low rotational speeds when loaded. This is utilized in the case of the control of the clutch 2 according to the invention.

Optionally, during the initial acceleration phase, the transferable torque of the clutch 2 can be slightly lowered with respect to the torque generated by the engine; perhaps when, despite a fairly strong operation of the accelerator pedal, the rotational speed of the engine 1 does not increase or increases only slightly. In this manner, the rotational speed of the engine can advantageously rise rapidly to ranges in which the producible torque of the engine 1 has a particularly high value.

If the accelerator pedal is operated before an approximated synchronism of the input and the output of the clutch 2 has occurred, the clutch will be increasingly engaged or closed only after a defined increase of the rotational speed of the engine 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Automatically controllable clutch between engine and a driving wheels in a transmission line of a motor vehicle, comprising a transmission configured to be shifted arbitrarily or manually between idling and at least one driving position, an accelerator pedal for controlling the power of the engine, a control device configured to control the clutch as a function of defined parameters detected by assigned sensors, and with the driving position engaged and the accelerator pedal not operated, has the effect that the clutch operates at its gripping point and transmits a low torque which is sufficient for a creeping of the vehicle on a level road or at a very low tractive resistance, wherein, with an approximated synchronism of the clutch input and the clutch output having been reached during a phase with an engaged driving position and with the accelerator pedal not operated, the clutch is arranged to be closed when the accelerator pedal is operated while maintaining the synchronism.

2. Clutch according to claim 1, wherein, during an operating phase with the engaged driving position, with the accelerator pedal not operated and no approximated synchronism of the clutch input and the clutch output having been reached, the clutch is arranged to be increasingly engaged only in the case of a slightly increased rotational speed of the engine with acceleration pedal operation.

3. Clutch according to claim 1, wherein transferrable torque of the clutch is slightly lowered with respect to torque of the engine when, independent of intensive operation of the accelerator pedal, the rotational speed of the engine increases at most only slightly.

4. Clutch according to claim 3, wherein, during an operating phase with the engaged driving position, with the accelerator pedal not operated and no approximated synchronism of the clutch input and the clutch output having been reached, the clutch is arranged to be increasingly engaged only in the case of a slightly increased rotational speed of the engine with acceleration pedal operation.

5. Clutch according to claim 1, wherein, with the accelerator pedal not operated and the driving position engaged, the clutch is arranged to be adjusted to a transferrable torque at least before the synchronism of the clutch input and clutch output is reached, which transferrable torque is slightly lower than an engine torque which can be reached by the engine when the driving pedal is not operated and the rotational engine speed is correspondingly low.

6. Clutch according to claim 5, wherein, during an operating phase with the engaged driving position, with the accelerator pedal not operated and no approximated synchronism of the clutch input and the clutch output having been reached, the clutch is arranged to be increasingly engaged only in the case of a slightly increased rotational speed of the engine with acceleration pedal operation.

7. Clutch according to claim 6, wherein transferrable torque of the clutch is slightly lowered with respect to torque of the engine when, independent of intensive operation of the accelerator pedal, the rotational speed of the engine increases at most only slightly.

8. Clutch according to claim 1, wherein the clutch is arranged to increasingly open as soon as the rotational engine speed falls below a low threshold value.

9. Clutch according to claim 8, wherein, during an operating phase with the engaged driving position, with the accelerator pedal not operated and no approximated synchronism of the clutch input and the clutch output having been reached, the clutch is arranged to be increasingly engaged only in the case of a slightly increased rotational speed of the engine with acceleration pedal operation.

10. Clutch according to claim 9, wherein transferrable torque of the clutch is slightly lowered with respect to torque of the engine when, independent of intensive operation of the accelerator pedal, the rotational speed of the engine increases at most only slightly.

11. Clutch according to claim 8, wherein, with the accelerator pedal not operated and the driving position engaged, the clutch is arranged to be adjusted to a transferrable torque at least before the synchronism of the clutch input and clutch output is reached, which transferrable torque is slightly lower than an engine torque which can be reached by the engine when the driving pedal is not operated and the rotational engine speed is correspondingly low.

12. Clutch according to claim 11, wherein transferrable torque of the clutch is slightly lowered with respect to torque of the engine when, independent of intensive operation of the accelerator pedal, the rotational speed of the engine increases at most only slightly.

13. Clutch according to claim 10, wherein, with the accelerator pedal not operated and the driving position engaged, the clutch is arranged to be adjusted to a transferrable torque at least before the synchronism of the clutch input and clutch output is reached, which transferrable torque is slightly lower than an engine torque which can be reached by the engine when the driving pedal is not operated and the rotational engine speed is correspondingly low.

* * * * *